(12) United States Patent
Chen

(10) Patent No.: US 6,647,254 B1
(45) Date of Patent: Nov. 11, 2003

(54) COMPUTER PERIPHERAL DEVICE WITH THE FUNCTIONS OF A RADIO, A MICROPHONE, AND A MOUSE

(75) Inventor: Hung-Wen Chen, Taipei Hsien (TW)

(73) Assignee: GemTek Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/356,380

(22) Filed: Jul. 19, 1999

(51) Int. Cl.⁷ .................................................. H04B 1/38
(52) U.S. Cl. ...................................... 455/344; 455/557
(58) Field of Search ................................ 455/344, 557, 455/550.1, 90.3, 347, 128, 91, 556.1, 556.2, 550, 525; 710/12, 1, 8, 15, 73, 106; 379/428, 433

(56) References Cited

U.S. PATENT DOCUMENTS

| | | | |
|---|---|---|---|
| 5,706,031 A | * | 1/1998 | Brendzel et al. ............. 345/172 |
| 5,809,115 A | * | 9/1998 | Inkinen ..................... 379/93.05 |
| 5,835,732 A | * | 11/1998 | Kikinis et al. ............... 710/303 |
| 5,999,798 A | * | 12/1999 | Yang ......................... 455/66.1 |
| 6,205,495 B1 | * | 3/2001 | Gilbert et al. .................. 710/8 |
| 6,293,798 B1 | * | 9/2001 | Boyle et al. .................. 434/29 |
| 6,560,469 B1 | * | 5/2003 | Kim et al. ................. 455/569.1 |

* cited by examiner

Primary Examiner—Pablo N Tran
(74) Attorney, Agent, or Firm—Jacobson Holman PLLC

(57) ABSTRACT

A computer peripheral device with the functions of a radio, a microphone, and a mouse consists of a USB control interface, a mouse circuit, a radio circuit, and a microphone. The USB control interface has a USB port for being connected to a computer. The mouse circuit and the radio circuit are connected to the USB control interface. The radio circuit consists of a phase lock loop, a frequency modulation circuit, an antenna, and an audio processing unit. The microphone circuit is connected to an audio processing unit. By the aforementioned structure, a coordinate signal is outputted from the USB control interface through the mouse circuit for controlling a computer program. The radio program serves to control the radio circuit through the USB control interface for receiving the broadcast program from a radio broadcasting station. Then, the audio processing unit serves to digitize the audio signal and then send the digital audio signal to the computer through the USB control interface for being converted back into an audio for being outputted. The microphone circuit serves to pick up a voice signal and then the signal is processed by the audio processing unit and then is sent to the computer through the USB control interface for being converted into voice for being outputted.

1 Claim, 4 Drawing Sheets

COMPUTER PERIPHERAL DEVICE WITH THE FUNCTIONS OF A RADIO, A MICROPHONE, AND A MOUSE

BACKGROUND OF THE INVENTION

1. Field of the Invention

The present invention relates to a computer peripheral device with the functions of a radio, a microphone, and a mouse, and especially to a computer peripheral device with a mouse circuit, a radio circuit, and a microphone circuit, Thus, the computer peripheral device has the function of a computer multimedia FM radio receiver, a microphone, and a mouse.

2. Description of the Prior Art

Since multimedia computers become a popular trend in the computer development, many computer peripheral devices are developed. Other than a mouse which become a necessary device of a computer, for a multimedia computer with audio and video functions, many computer peripheral devices including a speaker, a microphone, a scanner, a digital camera, etc., are more and more important. Microphones for voice input have become a necessary device. For example, a voice mail, Netmeeting, computer KTV, etc., need a microphone for inputting voices. Moreover, a radio for receiving a broadcast program is becoming an important device for a multimedia computer.

However, more and more computer peripheral devices in the multimedia computers induce many troubles. For example, one more peripheral device will occupies one more space, moreover, it will become complicated to users. Besides, the current USB (universal serial bus) is a newest computer interface and is a future standard interface for serially connecting peripheral devices so that the users may conveniently expand the equipment of a multimedia computer.

SUMMARY OF THE INVENTION

Accordingly, the object of the present invention is to provide a computer peripheral device with the functions of a radio, a microphone, and a mouse, which comprises a USB control interface, a mouse circuit, a radio circuit, and a microphone. The USB control interface has a USB port for being connected to a computer. The mouse circuit and the radio circuit are connected to the USB control interface. The radio circuit consists of a phase lock loop, a frequency modulation circuit, an antenna, and an audio processing unit. The microphone circuit is connected to an audio processing unit. By the aforementioned structure, a relative coordinate signal to position mouse cursor is outputted from the mouse circuit through the USB control interface for operation. The radio program serves to control the radio circuit through the USB control interface for receiving the broadcast program from a radio broadcasting station. Then, the audio processing unit serves to digitize the audio signal and then send the digital audio signal to the computer through the USB control interface for being converted back into an audio for being outputted. The microphone circuit serves to pick up a voice signal and then the signal is processed by the audio processing unit and then is sent to the computer through the USB control interface for being converted into voice for being outputted.

The present invention will be better understood and its numerous objects and advantages will become apparent to those skilled in the art by referencing to the following drawings in which:

DETAILED DESCRIPTION OF THE PREFERRED EMBODIMENT

Figure 1:
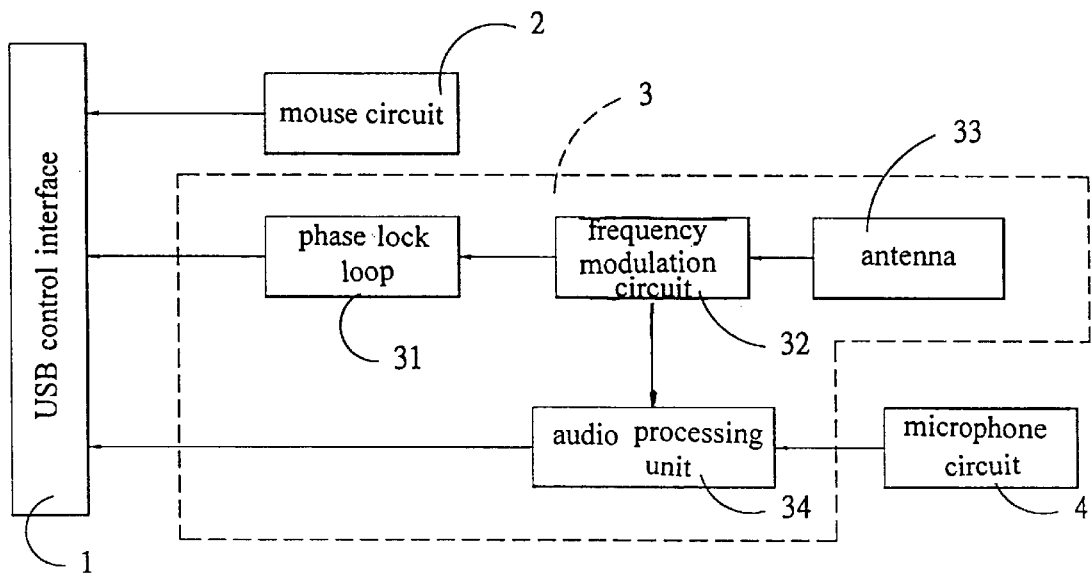
FIG. 1 shows a circuit diagram of the present invention.
Figure 2:
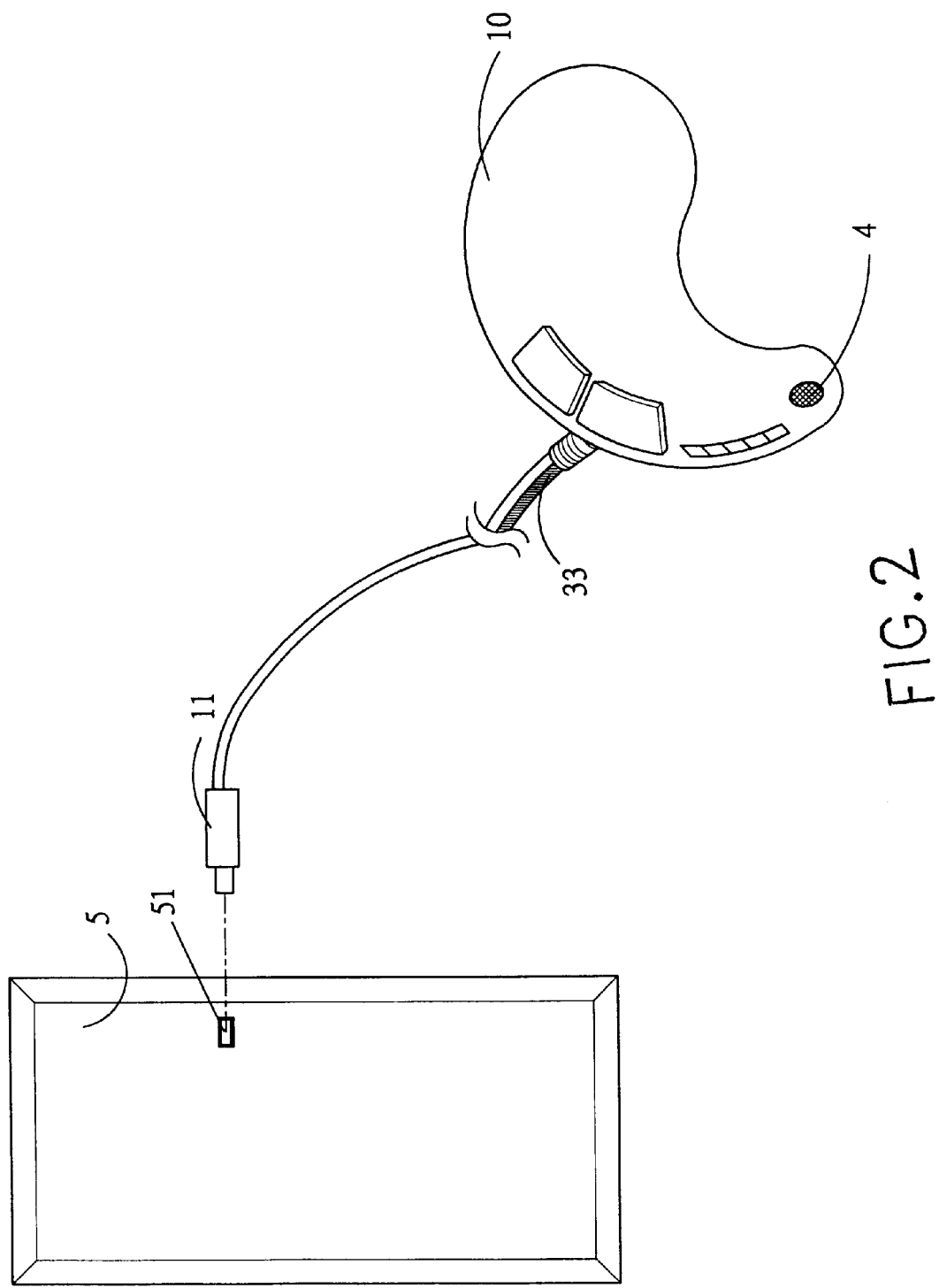
FIG. 2 is a schematic view showing the computer according to the present invention.

At first, with reference to FIGS. 1, and 2, in the present invention, a USB control interface 1, a mouse circuit 2, a radio circuit 3, and a microphone circuit 4 are installed within a body 10 with a mouse means.

The USB control interface 1 has a USB connector 11 to connect with the USB port 51 of a computer 5. The mouse circuit 2 serves to output coordinate signals of a mouse.

The radio circuit 3 is connected to the USB control interface 1. The radio circuit 3 consists of a phase lock loop 31, a frequency modulation circuit 32, an antenna 33, and an audio processing unit 34.

The phase lock loop 31 is connected to the USB control interface 1. The phase lock loop 31 receives the command from the USB control interface 1 so as to control the receiving action of the frequency modulation circuit 32.

The frequency modulation circuit 32 is connected to the phase lock loop 31. The frequency modulation circuit 32 consists of an amplifier, a mixer, and a demodulator. Thus, the amplifier may amplify the signals received by the antenna 33. Then through the mixer, a medium frequency (MF) signal is generated, then the MF signal is amplified. Finally, the MF signal is demodulated into a pulse frequency signal by a demodulator.

An audio processing unit 34 is connected to the frequency modulation circuit 32. The audio processing unit 34 consists of an amplifier, a filter, and an analog to digital converter. The audio processing unit 34 serves to process the aforesaid pulse frequency signal to digitize (or not) and then output the signal to the USB control interface 1, then it is connected to the computer 5 through an USB control interface 1 so as to convert into an audio for outputting.

A microphone circuit 4 is connected to an audio processing unit 34. The microphone circuit 4 serves to pick up a voice signal. Then, after processed by an audio processing unit 34, the digitized audio signal is connected to a computer 5 through the USB control interface 1 to be convert into a voice signal for being outputted.

According to the aforementioned structure, the USB port 11 of the body 10 is inserted into the USB port 51 of the computer 5, as shown in FIG. 2. Then the driver programs of the mouse, radio, and microphone are installed in the computer 5. When the computer 5 performs the driver software program, the computer sends commands to the USB control interface 1. Thus, the USB control interface I may sequentially process all of the output and input signals from mouse circuit 2, the radio circuit 3, and the microphone circuit 4, so that the body 10 may operate the function of mouse and at the same time operate the radio circuit 3.

Moreover, if the radio circuit 3 is operated, the computer 5 can send out command to the USB control interface 1 for controlling the aforementioned phase lock loop 31 so that the phase lock loop 31 can control the frequency modulation circuit 32. While, when the frequency modulation circuit 32 needs to inform the current status, such as changing the frequency, mute, function, mono or stereo status, to the computer 5, it may send signals back to the computer 5 through the USB control interface 1. Thus, the computer 5 and the radio circuit 3 can have a two-way communication.

The signal received by the frequency modulation circuit 32 is amplified by the amplifier of the frequency modulation circuit 32. Then, through a mixer, a MF signal is generated and is amplified. Then the MF signal is demodulated by a demodulator to generate a pulse frequency signal. Then, through the audio processing unit 34, the pulse signal is digitized, and then output to the USB control interface 1. Then, the signal is sent to the computer 5 through the USB control interface 1 to be converted into voices for being outputted.

Figure 3:
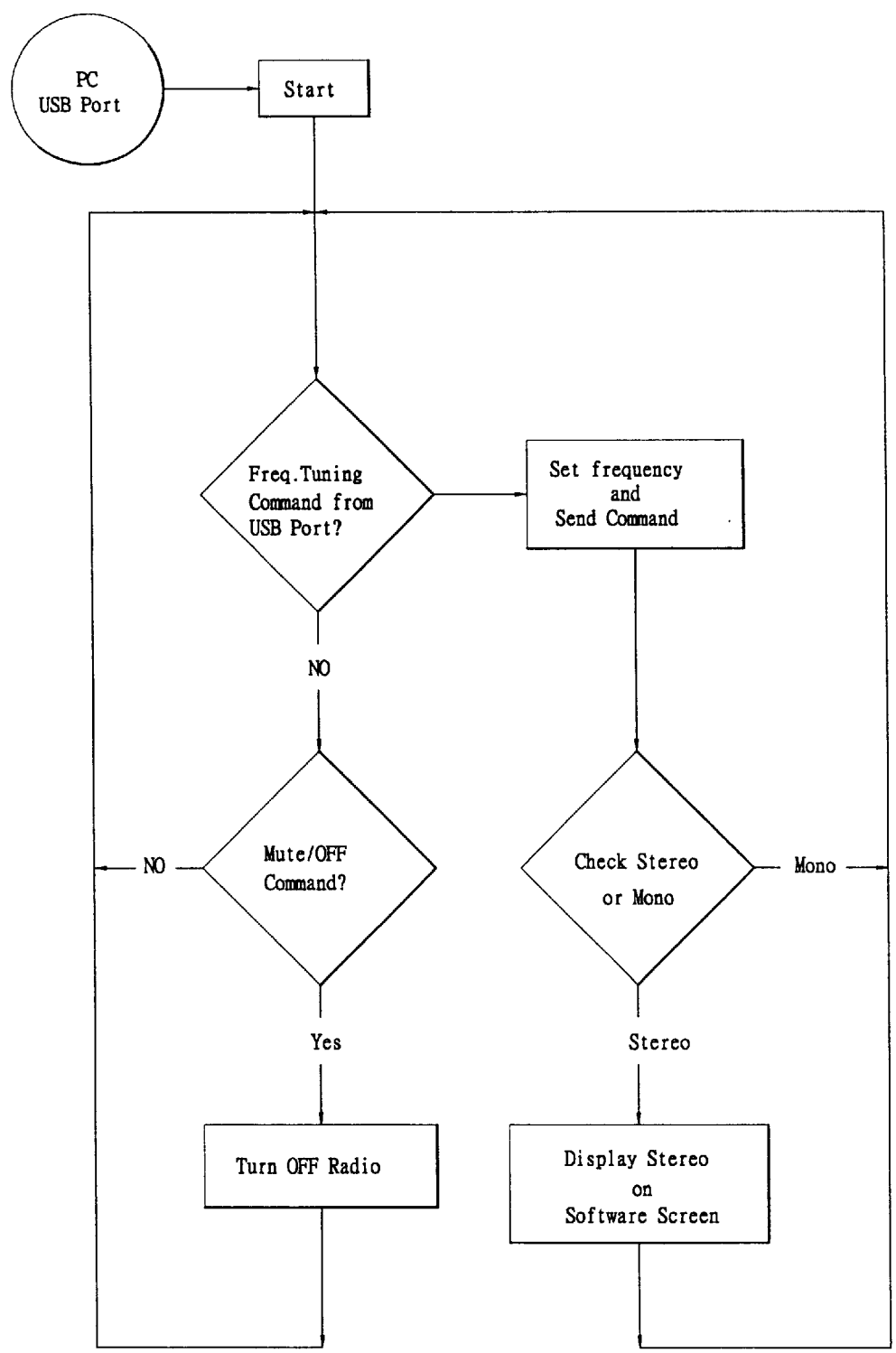
FIG. 3 shows the control flow diagram of the software program of a radio according to the present invention.

Moreover, the control flow diagram of the driver software program is shown in FIG. 3. When a computer 5 performs the software driving program, the mouse driver program is performed firstly to make mouse working, then it checks whether the commands of FREQ. TUNING COMMAND. If the frequency tuning command is performed, then the receiving frequency can be set. Then, the program will check the feedback status which is generated by radio circuit 3 and transmitted through USB control interface 1. The feedback status is to respond that receiving signal is stereo or mono, then the result could be displayed on a display. If the commands, FREQ. TUNING COMMAND do not be performed, then the program will check whether a mute mode (MUTE/OFF COMMAND) is performed. If it is in mute mode, then the power of the circuit is turned off. Otherwise, the program returns to early stage to request whether the command is performed. Therefore, by a software program running on a computer, the user can easily control all of the aforementioned functions of a FM radio receiver.

Since the microphone circuit 4 serves to pick up voice, then the microphone driver software serves to record voice signals, or send voice signals on the network such as Ethernet and Internet. Therefore, the user of a computer may use the present invention conveniently.

Other than outputting the mouse coordinate signals originally, the body 10 can be used to receive the radio signal from a broadcast station, receive the broadcast program, and pick up voice signals of the microphone circuit 4, thus the present invention is a device with a multiple functions.

Figure 4:
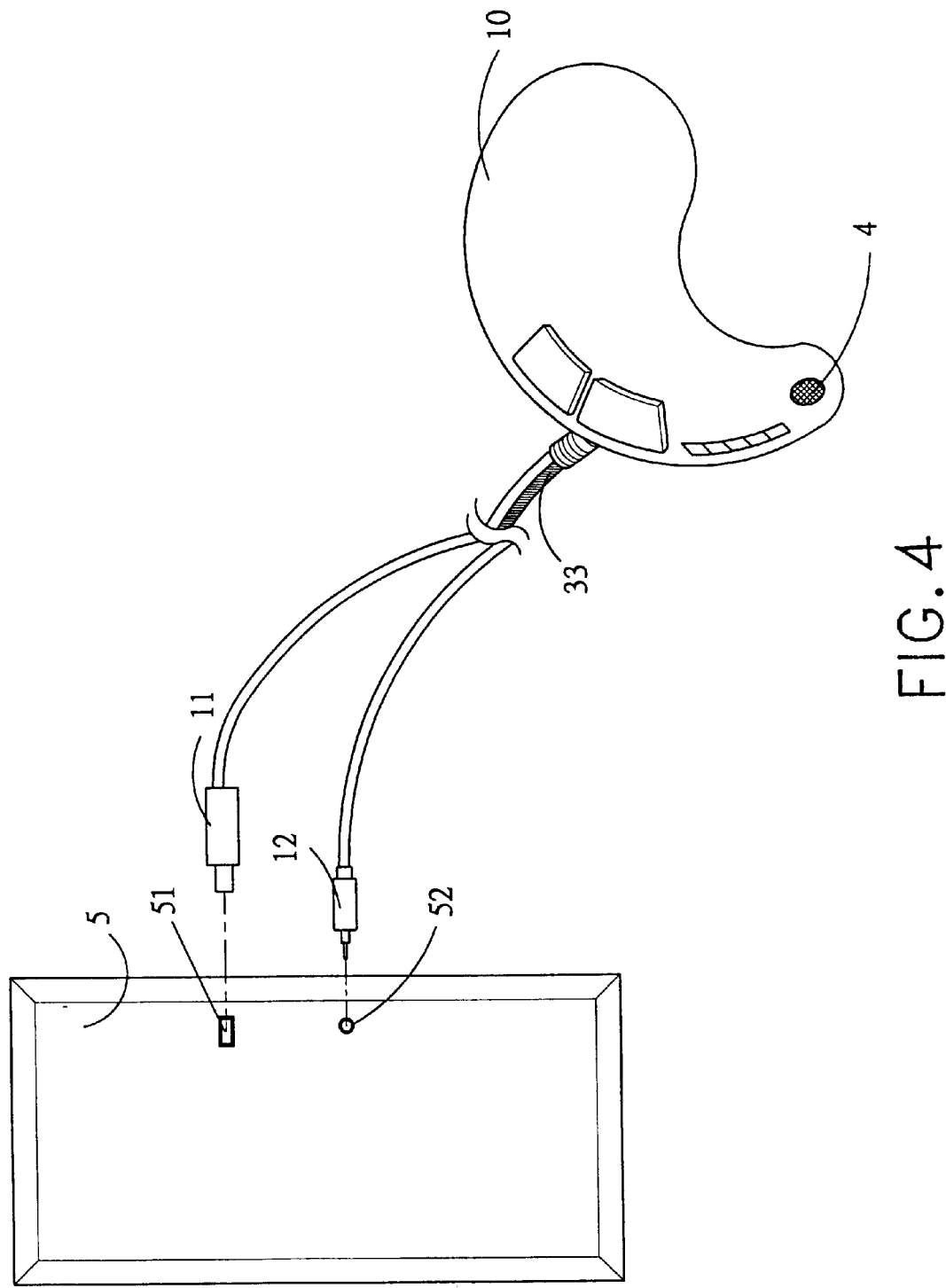
FIG. 4 shows another embodiment of the present invention.

With reference to FIG. 4, another embodiment of the present invention is illustrated. The USB port 11 is further split with an audio signal plug 12, and the audio processing unit 34 may neglect the analog to digital converter. The audio signal plug 12 can be inserted into the audio signal input receptacle 52 of the sound card of the computer 5. Therefore, the audio signal can be directly converted for being processed by the sound card.

Although the present invention has been described using specified embodiment, the examples are meant to be illustrative and not restrictive. It is clear that many other variations would be possible without departing from the basic approach, demonstrated in the present invention.

What is claimed is:

1. A computer peripheral device with the functions of a radio, a microphone, and a mouse comprising:

a USB control interface having a USB port for connecting to a computer;

a mouse circuit connected to the USB control interface for outputting a mouse coordinate signal; and a radio circuit connected to the USB control interface, the radio circuit consists of a phase lock loop, a frequency modulation circuit, an antenna, and an audio processing unit, wherein the phase lock loop is connected to the USB control interface for receiving the commands from the USB control interface and controlling the frequency modulation circuit;

the frequency modulation circuit is connected to the phase lock loop, the frequency modulation circuit consists of an amplifier, a mixer, and a demodulator, the amplifier serves to amplify the signal received by the antenna, and then signal passes through the mixer for generating a medium frequency (MF) signal, then the MF signal is amplified and passes through a demodulator for being demodulated as a pulse frequency signal;

the antenna is connected to a frequency modulation circuit and serves to receive the electromagnetic wave of a broadcasting station;

the audio processing unit is connected to the frequency modulation circuit, the audio processing unit consists of an amplifier, a filter, and an analog to digital converter; the audio processing unit serves to process the pulse frequency signal and then output the signal to the USB control interface, and then the digitized audio signal is sent to the computer for being converted as audio for being outputted; if the audio processing unit neglect the analog to digital converter, then the analog audio signal may be sent to the computer through the USB control interface; and the microphone circuit is connected to the audio processing unit, the microphone circuit serves to pick up voice signals, then after processed by the audio processing unit, the digitized audio signals are sent to the computer for being converted into voices for being outputted.

* * * * *